April 3, 1951  J. K. DOUGLAS  2,547,154
CONTROLLER FOR HYDRODYNAMIC MACHINES
Filed Jan. 24, 1946

*INVENTOR.*
JAMES K. DOUGLAS
BY
ATTORNEY.

Patented Apr. 3, 1951

2,547,154

UNITED STATES PATENT OFFICE 2,547,154

CONTROLLER FOR HYDRODYNAMIC MACHINES

James K. Douglas, Shorewood, Wis., assignor to The Oilgear Company, Milwaukee, Wis., a corporation of Wisconsin Application January 24, 1946, Serial No. 643,092

20 Claims. (Cl. 103—38)

This invention relates to controllers for rotary hydrodynamic machines of the type which when driven mechanically will function as pumps and when supplied with liquid under pressure will function as motors.

The hydrodynamic machine to which the invention applies in particular is adapted to have its displacement varied to thereby vary its volumetric delivery if it is functioning as a pump or to vary its speed if it is functioning as a motor.

Such a machine is frequently employed to perform work which requires the highest possible degree of accuracy in its delivery rate, if functioning as a pump, or in its speed if functioning as a motor.

However, rotary hydrodynamic machines have as an inherent characteristic thereof an internal leakage or slip which is composed primarily of small volumes which leak out of the valve which controls the flow of liquid to and from the cylinders and other small volumes which pass across the face of the valve from the high pressure port to the low pressure port. This slip or leakage varies in accordance with variations in the pressure and the viscosity of the liquid which is ordinarily a good grade of lubricating oil.

Therefore, a hydrodynamic machine must be adjusted to compensate for variations in slip in order that its volumetric delivery may be maintained constant if it is functioning as a pump or to maintain its speed constant if it is functioning as a motor. Also, if two such machines are hydraulically connected to form a transmission, either one of the machines must be adjusted to compensate for variations in the slip of both machines or each machine must be adjusted to compensate for the variations in its own slip in order to maintain the output speed of the transmission constant.

The pressure varies in accordance with variations in the load carried by the motor and the viscosity of the oil varies in accordance with the temperature thereof. The variation in slip due to one of these factors is also dependent upon the other factor. For example, the slip resulting from a given increase in pressure when the liquid has a high temperature might be twice as great as the slip resulting from the same change in pressure when the liquid has a given low temperature. Conversely, the slip resulting from a given increase in temperature when the pressure is high might be twice as great as the slip resulting from the same change in temperature when the pressure is low.

Therefore, an adjustment of the machine to compensate for variations in slip resulting from one factor should always be made in view of the condition created in the liquid by the other factor if the net delivery of the pump or speed of the motor is to be maintained uniformly constant.

The present invention has as an object to provide a controller which will automatically adjust a hydrodynamic machine to compensate for variations in slip due to variations in both pressure and temperature.

Another object is to provide a slip compensator which is more accurate than the prior slip compensators.

Another object is to provide a slip compensator which is simple in construction and economical to manufacture.

Other objects and advantages will be apparent from the description hereinafter given of a controller in which the invention is embodied.

Since the same machine will function as a pump when driven mechanically or will function as a motor when supplied with liquid under pressure, a machine to which the invention is applied will be referred to herein as a pump but it is to be understood that the invention is equally applicable to a motor and that such reference in no way limits the invention to use in connection with a pump.

The invention is exemplified by the controllers shown in the accompanying drawing in which the views are as follows.

Figure 1:
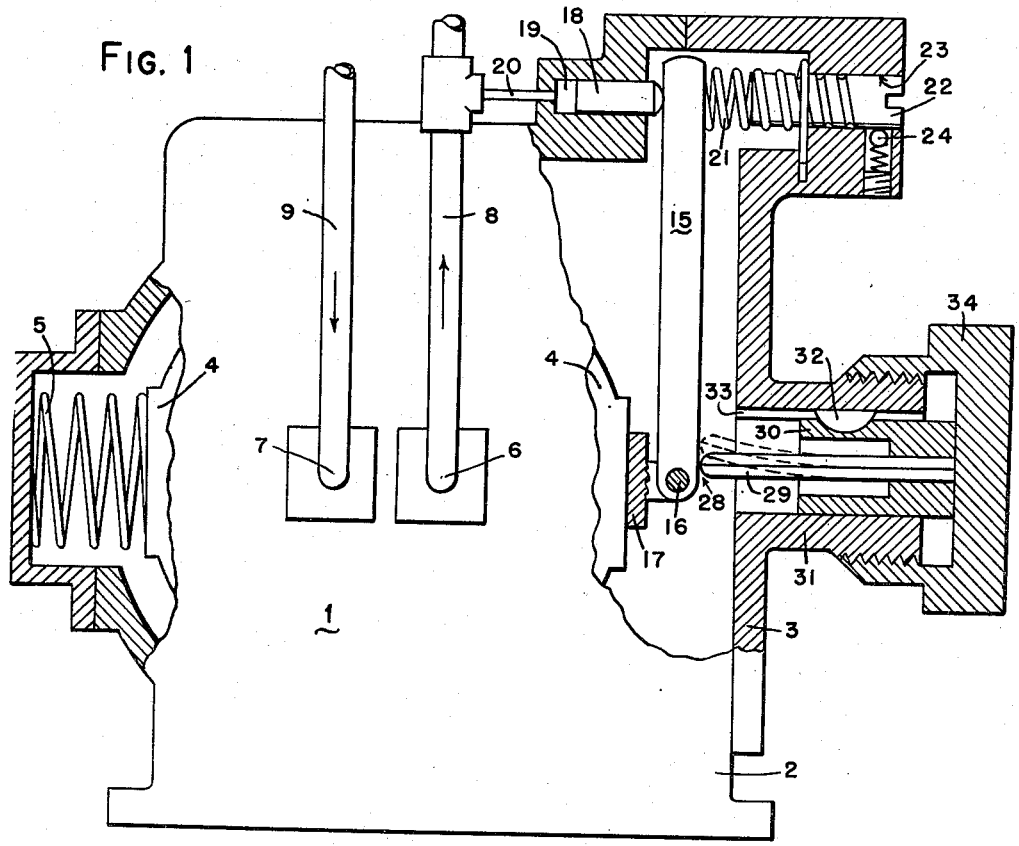
Fig. 1 is a view showing an embodiment of the invention applied to a pump and adapted to compensate for variations in slip during delivery of liquid by the pump in one direction only, the view being somewhat schematic in character.

The invention has been shown in Fig. 1 applied to a pump 1 which has not been illustrated in detail since it is of a well-known construction. It is deemed sufficient to state herein that pump 1 has its mechanism arranged within a casing 2 which is closed at one side by a removable plate 3, that its pumping mechanism is arranged within a displacement varying member or slide block 4 which is arranged within casing 2 and adapted to be shifted to vary pump delivery, and that slide block 4 is constantly urged toward the right such as by means of a spring 5 but a hydraulic servo-motor may be employed for this purpose according to common practice.

When pump 1 is driven and its slide block 4 is in its central or neutral position, the pump is at zero stroke and no liquid will be delivered thereby. If slide block 4 is shifted to the left of its neutral position, pump 1 will discharge liquid through a port 6 and liquid will be returned to it through a port 7. If slide block 4 should be shifted to the right of its neutral position, it would discharge liquid through port 7 and liquid would be returned to it through port 6.

The controller shown in Fig. 1 is adapted to compensate for variations in the slip of a pump during delivery of liquid thereby in one direction only. As shown, the controller is effective only when pump 1 delivers liquid through port 6 and a channel 8 connected thereto and has liquid returned to it through a channel 9 which is connected to port 7.

The controller includes a lever 15 having one end thereof pivotally connected to the right end of slide block 4 as by means of a pin 16 and a bracket 17. The side of lever 15 adjacent slide block 4 is engaged near the other end thereof by a piston 18 fitted in a stationary cylinder 19 which is carried by casing 2 and connected by channel 20 to channel 8 so that piston 18 exerts upon lever 15 a force proportional to the pressure created by pump 1.

The action of piston 18 is opposed by a helical compression spring 21 which is arranged between the opposite side of lever 15 and the inner face of plate 3. A plug 22, having a spiral groove formed therein, is threaded into spring 21 and is rotatable in a bore 23 formed in plate 3. The arrangement is such that the effective length of spring 21 is that part between lever 15 and the adjacent end of plug 22. When plug 22 is rotated, it will advance or retract within spring 21 and thereby vary the effective length and the resistance of the spring 21. Plug 22 may be retained in an adjusted position as by means of a spring pressed ball 24.

Piston 18 and spring 21 have been shown arranged at the top of casing 2 in order to simplify the drawing but preferably they are arranged below the horizontal center line of the pump. That is, the entire control is preferably rotated about the horizontal axis of the pump 180° from the position shown.

Lever 15 is urged by spring 5 against a fulcrum 28 which is arranged upon one end of a bimetallic bar 29 and engages lever 15 near pivot 16 to limit the movement of slide block 4 toward the right under the influence of spring 5. Fulcrum 28 may be the end of bar 29, as shown, or it may be a piece of metal fastened thereto. The other end portion of bar 29 is rigidly secured in a guide 30 slidably fitted in the interior of a sleeve 31 which is fixed to or formed integral with plate 3. Rotation of bar 29 is prevented in any suitable manner such as by means of a key 32 fitted in guide 30 and slidable in a keyway 33 formed in sleeve 31.

The right end of bar 29 and/or the right end of guide 30 engage the inner face of a hollow adjusting screw 34 which is threaded upon the outside of sleeve 31 and holds bar 29 stationary to enable lever 15 to pivot upon fulcrum 28 and effect movement of slide block 4 in response to operation of lever 15 by piston 18 or spring 21. Fulcrum 28 engages lever 15 at a point very close to the axis of pin 16 so that a substantial movement of piston 18 results in only a slight movement of slide block 4.

Bar 29 is composed of two strips of dissimilar metals having a considerable difference in their coefficients of expansion and so located in respect to each other that an increase in the temperature within casing 2 will cause fulcrum 28 to move farther from the axis of pivot 16. For example, bar 29 may be composed of a strip of Invar and a strip of bronze and be rigidly secured in guide 30 with the bronze strip on the side thereof toward the axis of pivot 16.

Operation of the pump under pressure causes the motive oil to become heated, as is well-known, and heat is transmitted from the motive oil to the air and oil vapor within casing 2. The temperature of the air and oil vapor is not as high as the temperature of the oil but it is substantially proportional thereto so that an increase in the temperature of the oil causes a substantially proportional increase in the temperature within casing 2.

Due to the difference in the coefficients of expansion of the two strips, an increase in the temperature within casing 2 will cause bar 29 to bend, as indicated in dotted lines, and move fulcrum 28 farther from the axis of pin 16, thereby increasing the length of the load arm of lever 15 and consequently increasing the distance through which slide block 4 is moved in response to a given movement of piston 18.

Lever 15, piston 18 and spring 21 are so proportioned and spring 21 is so adjusted that, when the temperature is normal so that fulcrum 28 is engaging lever 15 close to the axis of pivot 16, an increase in pump pressure will cause slide block 4 to be moved toward the left just enough to increase pump displacement by an amount equal to the increase in slip due to the increase in pressure at normal temperature.

Bar 29 is so proportioned that an increase in temperature will cause it to move fulcrum 28 just far enough along lever 15 to cause lever 15 to further increase pump displacement by an amount equal to the further increase in slip due to the increase in temperature.

Assuming that screw 34 is adjusted to hold slide block 4 a predetermined distance toward the left from its neutral position, pump 1 when driven will discharge liquid through channel 8 at a rate proportional to the distance slide block 4 is offset from its neutral position and any pressure created by the pump will extend through channel 20 and act upon piston 18.

If pump pressure is very low, the slip will be negligible and the slip compensating control will be inactive but if pump pressure exceeds a predetermined minimum, piston 18 will exert sufficient force to enable it to swing the upper end of lever 15 toward the right a distance substantially proportional to the increase in pressure above the predetermined minimum. Lever 15 will pivot upon fulcrum 28 and shift slide block 4 toward the left through a distance which is proportional to the distance the upper end of lever 15 is moved and is also proportional to the distance fulcrum 28 is offset from the axis of pivot 16.

If pump pressure thereafter decreases, spring 21 will move the upper end of lever 15 toward the left a distance substantially proportional to the decrease in pressure below the previous maximum. Lever 15 will pivot upon fulcrum 28 and spring 5 will move slide block 4 toward the right through a distance which is proportional to the distance through which the upper end of lever 15 was moved toward the left and is also proportional to the distance fulcrum 28 is offset from the axis of pivot 16.

Bimetallic bar 29 moves fulcrum 28 along lever 15 in response to a change in the temperature and thereby varies the distance through which slide block 9 is moved in response to any given variation in pressure.

With slide block 4 in any adjusted position at the left of its neutral position, the volumetric delivery of the pump is thus maintained substantially constant by varying pump displacement by an amount substantially equal to the slip of the pump due to variations in pressure at any temperature within the range of temperatures ordinarily prevailing within the pump.

In the foregoing explanation it has been assumed that the pump delivers liquid through the right hand port with the slide block shifted toward the left from its neutral position. However, if the pump delivered through the left hand port when the slide block was shifted toward the left from neutral or if it delivered through the right hand port when the slide block was shifted toward the right from neutral, piston 18 and spring 21 would be reversed. That is, spring 21 would be arranged upon the left side of lever 15 and piston 18 would be arranged upon the right side of lever 15 and its cylinder 19 would be connected to the delivery port.

A pump is sometimes required to deliver liquid in opposite directions alternately at rates which should be maintained constant, such as for energizing a motor which drives a carriage of a machine tool at feed rates in opposite directions alternately. This may be accomplished by operating lever 15 in response to variations in pressure created by the pump in ports 6 and 7 alternately.

Figure 2:
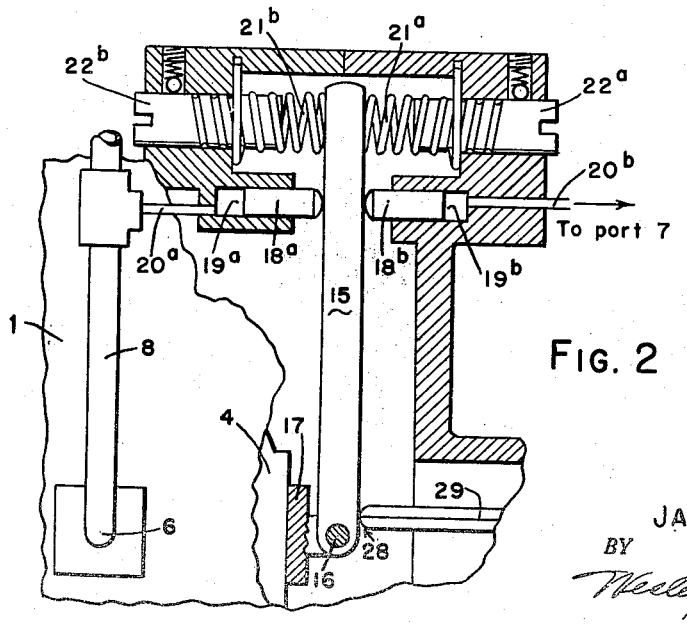
Fig. 2 is a view showing a controller similar to that shown in Fig. 1 but adapted to compensate for variations in the slip of a pump during delivery of liquid in either direction.

As shown in Fig. 2, two pistons 18a and 18b engage lever 15 upon opposite sides thereof and two springs 21a and 21b engage lever 15 upon opposite sides thereof. Pistons 18a and 18b are similar to piston 18 and are fitted, respectively, in cylinders 19a and 19b which are connected by channels 20a and 20b to ports 6 and 7 respectively. The effective lengths of springs 21a and 21b are regulated by spirally grooved plugs 22a and 22b which are threaded therein and are similar to plug 22.

When the pump is delivering liquid through port 6 and pump pressure exceeds a predetermined minimum, piston 18a will swing the upper end of lever 15 toward the right against the resistance of spring 21a to compensate for the increase in slip resulting from the increase in pressure. When the pump is delivering liquid through port 7 and pump pressure exceeds a predetermined minimum, piston 18b will swing the upper end of lever 15 toward the left against the resistance of spring 21b to compensate for the increase in slip resulting from the increase in pressure.

The control shown in Fig. 2 thus functions in the same manner as the control shown in Fig. 1 except that it compensates for variations in slip regardless of the direction of pump delivery.

The slip compensating control described herein may be modified in various ways and applied to various hydrodynamic machines without departing from the scope of the invention which is hereby claimed as follows:

1. In a pump having a member movable toward and from a neutral position to vary pump displacement and urged in one direction, the combination of a lever having a pivotal connection with said member, a fulcrum for said lever, means for holding said fulcrum against movement by said lever to thereby limit the movement of said member in said direction and responsive to variations in temperature for shifting said fulcrum along said lever, a piston for applying force to said lever at a point remote from said connection, a spring opposing the action of said piston, and means for subjecting said piston to the pressure created by said pump to enable said piston to compress said spring and tilt said lever upon said fulcrum to thereby move said member in a direction to increase pump displacement in response to pump pressure exceeding a predetermined value.

2. In a pump having a member movable toward and from a neutral position to vary pump displacement and urged in one direction, the combination of a lever having a pivotal connection with said member, a fulcrum for said lever, means for holding said fulcrum against movement by said lever to thereby limit the movement of said member in said direction and responsive to variations in temperature for shifting said fulcrum along said lever, a piston for applying force to said lever at a point remote from said connection, a spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, and means for adjusting the resistance of said spring.

3. In a pump having a member movable toward and from a neutral position to vary pump displacement and urged in one direction, the combination of a lever having a pivotal connection with said member, a fulcrum for said lever, means for holding said fulcrum against movement by said lever to thereby limit the movement of said member in said direction and responsive to variations in temperature for shifting said fulcrum along said lever, a piston for applying force to said lever at a point remote from said connection, a spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, and means for varying the effective length of said spring.

4. In a pump having a member movable toward and from a neutral position to vary pump displacement and urged in one direction, the combination of a lever having a pivotal connection with said member, a fulcrum for said lever, means for holding said fulcrum against movement by said lever to thereby limit the movement of said member in said direction and responsive to variations in temperature for shifting said fulcrum along said lever, a piston for applying force to said lever at a point remote from said connection, a spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, and a spirally grooved plug threaded into said spring and adapted to be rotated to vary the effective length of said spring.

5. In a pump having a member movable toward and from a neutral position to vary pump displacement and urged in one direction, the combination of a lever having pivotal connection with said member, a bimetallic bar normally restrained from axial movement, a fulcrum carried by said bar and engaging said lever near said pivotal connection to limit the movement of said member in said direction, a piston for applying force to said lever at a point remote from said connection, a spring opposing the action of said piston, and means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston.

6. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston for applying force to said lever at a point remote from said connection, a spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston, and means for adjusting the resistance of said spring.

7. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston for applying force to said lever at a point remote from said connection, a spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston, and means for shifting said bar axially to thereby regulate the displacement of said pump.

8. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston for applying force to said lever at a point remote from said connection, a spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston, and means for varying the effective length of said spring.

9. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston for applying force to said lever at a point remote from said connection, a helical spring opposing the action of said piston, means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston, and a spirally grooved plug threaded into said spring and adapted to be rotated to vary the effective length of said spring.

10. In a pump having a member movable toward and from a neutral position to vary pump displacement and urged in one direction, the combination of a lever having a pivotal connection with said member, a fulcrum for said lever, means for holding said fulcrum against movement of said lever to thereby limit the movement by said lever to thereby limit the responsive to variations in temperaure for shifting said fulcrum along said lever, a piston engaging one side of said lever at a point remote from said connection, a helical compression spring engaging the opposite side of said lever to oppose said piston, and means for subjecting said piston to the pressure created by said pump to enable said piston to compress said spring and tilt said lever upon said fulcrum to thereby move said member in a direction to increase pump displacement in response to pump pressure exceeding a predetermined value.

11. In a pump having a member movable toward and from a neutral position to vary pump displacement and urged in one direction, the combination of a lever having a pivotal connection with said member, a fulcrum for said lever, means for holding said fulcrum against movement by said lever to thereby limit the movement of said member in said direction and responsive to variations in temperature for shifting said fulcrum along said lever, a piston engaging one side of said lever at a point remote from said connection, a helical compression spring engaging the opposite side of said lever to oppose said piston, means for subjecting said piston to the pressure created by said pump to enable said piston to compress said spring and tilt said lever upon said fulcrum to thereby move said member in a direction to increase pump displacement in response to pump pressure exceeding a predetermined value, and a spirally grooved plug threaded into said spring and adapted to be rotated to vary the effective length of said spring.

12. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston engaging one side of said lever at a point remote from said connection, a helical compression spring engaging the opposite side of said lever to oppose said piston, and means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston.

13. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston engaging one side of said lever at a point remote from said connection, a helical compression spring engaging the opposite side of said lever to oppose said piston, means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston, and a spirally grooved plug threaded into said spring and adapted to be rotated to vary the effective length of said spring.

14. In a pump having a member movable toward and from a neutral position to vary pump displacement and urged in one direction, the combination of a lever having a pivotal connection with said member, a bimetallic bar normally restrained from axial movement, a fulcrum carried by said bar and engaging said lever near said pivotal connection to limit the movement of said member in said direction, a piston engaging one side of said lever at a point remote from said connection, a helical compression spring engaging the opposite side of said lever to oppose said piston, means for subjecting said piston to the pressure created by said pump to enable said piston to compress said spring and tilt said lever upon said fulcrum to thereby move said member in a direction to increase pump displacement in response to pump pressure exceeding a predetermined value, said bar being responsive to variations in temperature to move said fulcrum along said lever to thereby vary the distance through which said member is moved by said piston, and means for shifting said bar axially to thereby regulate the displacement of said pump.

15. In a pump having a displacement varying member movable in either direction from a neutral position to cause said pump to deliver liquid in a direction and at a rate dependent upon the direction and distance said member is offset from its neutral position, the combination of means for effecting movement of said member to an adjusted position at either side of neutral, pressure responsive means for causing said member to move from an adjusted position at either side of neutral in a direction to increase pump delivery in response to pump pressure exceeding a predetermined minimum, and means for causing said pressure responsive means to further increase pump delivery in response to an increase in the temperature within said pump.

16. In a pump having a displacement varying member movable in either direction from a neutral position to cause said pump to deliver liquid in a direction and at a rate dependent upon the direction and distance said member is offset from its neutral position and means for urging said member in one direction, the combination of means for effecting movement of said member to an adjusted position at either side of neutral, pressure responsive means for causing said member to move from an adjusted position at either side of neutral in a direction to increase pump delivery in response to pump pressure exceeding a predetermined minimum, and means for causing said pressure responsive means to further increase pump delivery in response to an increase in the temperature within said pump.

17. In a pump having a displacement varying member movable in either direction from a neutral position to cause said pump to deliver liquid in a direction and at a rate dependent upon the direction and distance said member is offset from its neutral position and means for urging said member in one direction, the combination of means for effecting movement of said member to an adjusted position at either side of neutral, a lever having a pivotal connection with said member, a fulcrum for said lever, means for holding said fulcrum against movement by said lever to thereby limit the movement of said member in said direction and responsive to variations in temperature for shifting said fulcrum along said lever, two pistons engaging opposite sides of said lever at points remote from said connection, two helical compression springs engaging opposite sides of said lever and opposing said pistons respectively, and means for subjecting one or the other of said pistons to pump pressure during delivery of liquid by said pump in one direction or the other to enable the piston subjected to pressure to tilt said lever upon said fulcrum and thereby move said member in a direction to increase pump displacement in response to pump pressure exceeding a predetermined value.

18. In a pump having a displacement varying member movable in either direction from a neutral position to cause said pump to deliver liquid in a direction and at a rate dependent upon the direction and distance said member is offset from its neutral position and means for urging said member in one direction, the combination of means for effecting movement of said member to an adjusted position at either side of neutral, a lever having a pivotal connection with said member, a fulcrum for said lever, means for holding said fulcrum against movement by said lever to thereby limit the movement of said member in said direction and responsive to variations in temperature for shifting said fulcrum along said lever, two pistons engaging opposite sides of said lever at points remote from said connection, two helical compression springs engaging opposite sides of said lever and opposing said pistons respectively, means for subjecting one or the other of said pistons to pump pressure during delivery of liquid by said pump in one direction or the other to enable the piston subjected to pressure to tilt said lever upon said fulcrum and thereby move said member in a direction to increase pump displacement in response to pump pressure exceeding a predetermined value, and a spirally grooved plug threaded into each of said springs and adapted to be rotated to vary the effective length of the spring.

19. In a pump having a displacement varying member movable in either direction from a neutral position to cause said pump to deliver liquid in a direction and at a rate dependent upon the direction and distance said member is offset from its neutral position and means for urging said member in one direction, the combination of means for effecting movement of said member to an adjusted position at either side of neutral, a lever having a pivotal connection with said member, a bimetallic bar normally restrained from axial movement, a fulcrum carried by said bar and engaging said lever near said pivotal connection to limit the movement of said member in said direction, two pistons engaging opposite sides of said lever at points remote from said connection, two helical compression springs engaging opposite sides of said lever and opposing said pistons respectively, and means for subjecting one or the other of said pistons to pump pressure during delivery of liquid by said pump in one direction or the other to enable the piston subjected to pressure to tilt said lever upon said fulcrum and thereby move said member in a direction to increase pump displacement in response to pump pressure exceeding a predetermined value, said bar being responsive to variations in temperature to move said fulcrum along said lever to thereby vary the distance through which said member is moved by either of said pistons.

20. In a pump having a displacement varying member movable in either direction from a neutral position to cause said pump to deliver liquid in a direction and at a rate dependent upon the direction and distance said member is offset from its neutral position and means for urging said member in one direction, the combination of means for effecting movement of said member to an adjusted position at either side of neutral, a lever having a pivotal connection with said member, a bimetallic bar normally restrained from axial movement, a fulcrum carried by said bar and engaging said lever near said pivotal connection to limit the movement of said member in said direction, two pistons engaging opposite sides of said lever at points remote from said connection, two helical compression springs engaging opposite sides of said lever and opposing said pistons respectively, means for subjecting one or the other of said pistons to pump pressure during delivery of liquid by said pump in one direction or the other to enable the piston subjected to pressure to tilt said lever upon said fulcrum and thereby move said member in a direction to increase pump displacement in response to pump pressure exceeding a predetermined value, said bar being responsive to variations in temperature to move said fulcrum along said lever to thereby vary the distance through which said member is moved by either of said pistons, and a spirally grooved plug threaded into each of said springs and adapted to be rotated to vary the effective length of the spring.

JAMES K. DOUGLAS.

REFERENCES CITED

The following references are of record in the file of this patent:

UNITED STATES PATENTS

| Number | Name | Date |
|---|---|---|
| 1,965,937 | Ferris | July 10, 1934 |
| 2,165,744 | Boettinger | July 11, 1939 |
| 2,214,552 | Ferris | Sept. 10, 1940 |